Dec. 21, 1943.   W. J. RADY   2,337,494
GENERATOR REGULATOR
Filed April 10, 1942   5 Sheets-Sheet 1

INVENTOR
William J. Rady
BY Spencer, Hardman & Feler
his ATTORNEYS

INVENTOR
William J. Rady
BY
Spencer, Hardman & Fehr
his ATTORNEYS

Dec. 21, 1943.                W. J. RADY                 2,337,494
                        GENERATOR REGULATOR
           Filed April 10, 1942            5 Sheets-Sheet 3
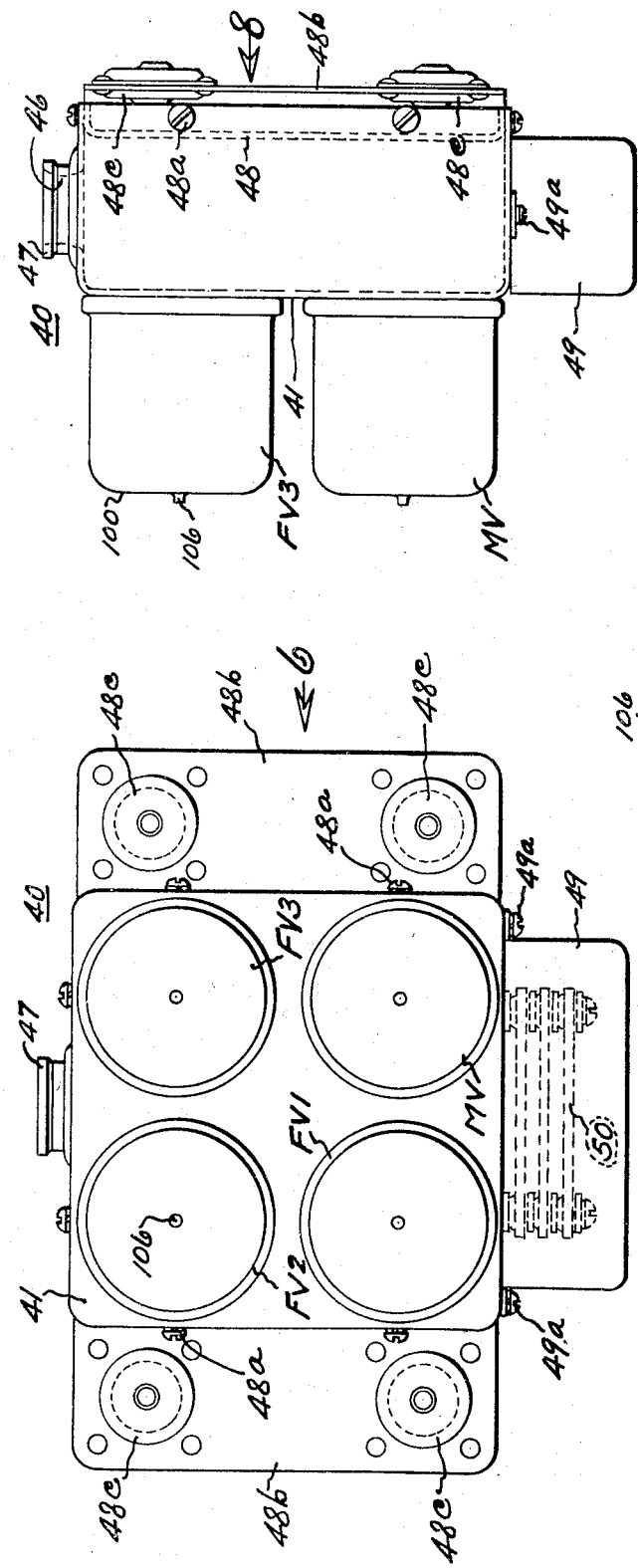
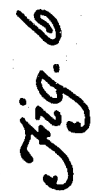
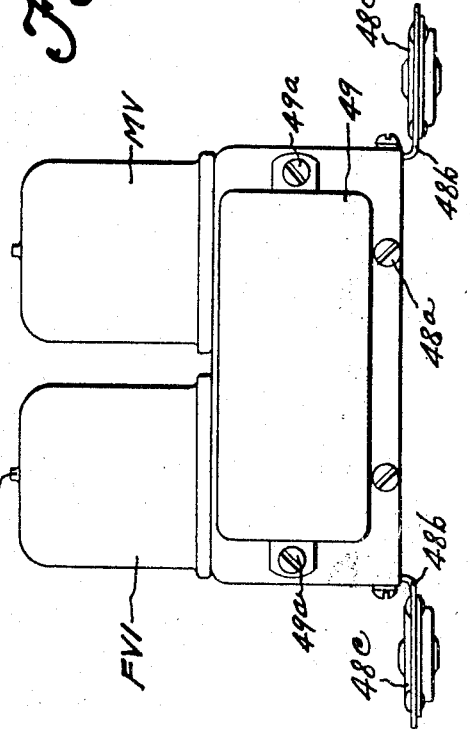
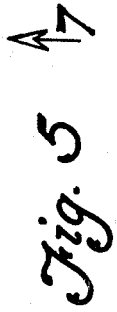
INVENTOR
William J. Rady
BY
Spencer, Hardman & Fehr
his ATTORNEYS Dec. 21, 1943.   W. J. RADY   2,337,494
GENERATOR REGULATOR
Filed April 10, 1942   5 Sheets-Sheet 4
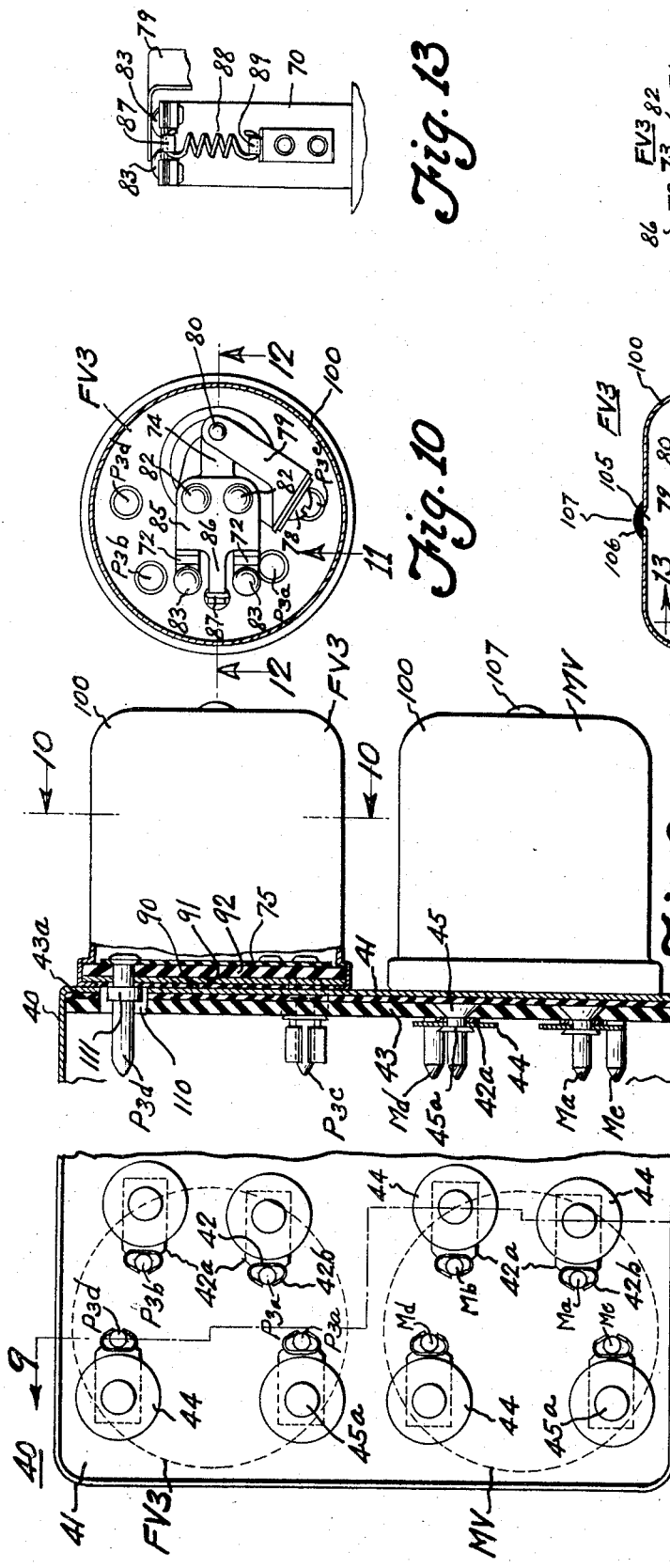
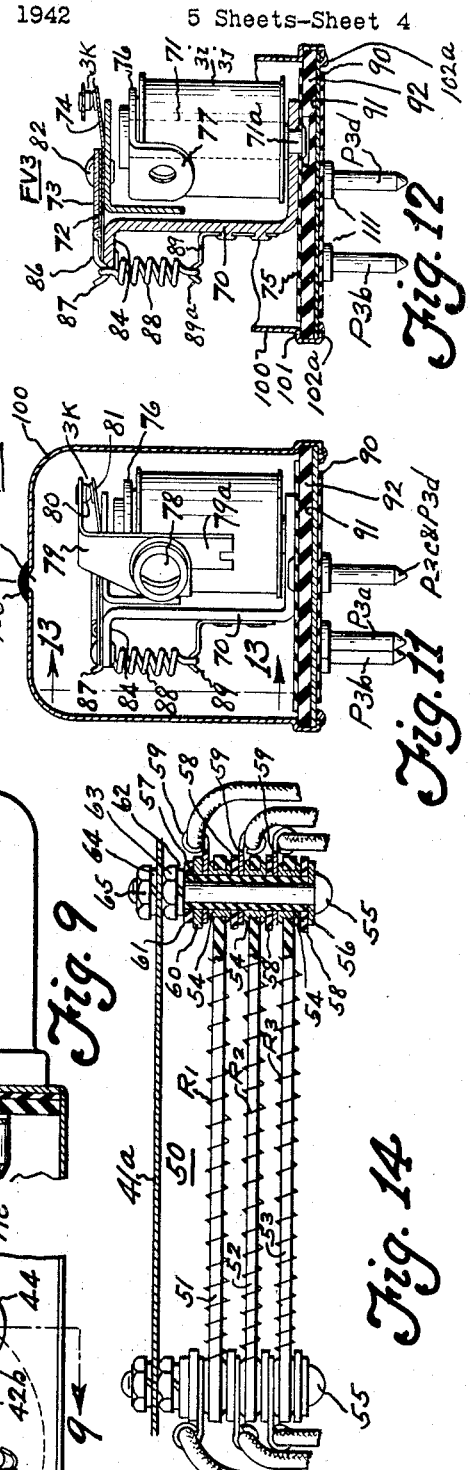
INVENTOR
William J. Rady
BY
Spencer, Hardman & Fehr
his ATTORNEYS Dec. 21, 1943.  W. J. RADY  2,337,494
GENERATOR REGULATOR
Filed April 10, 1942  5 Sheets-Sheet 5

INVENTOR
William J. Rady
Spencer, Hardman & Fehr
his ATTORNEYS

Patented Dec. 21, 1943

2,337,494

UNITED STATES PATENT OFFICE 2,337,494

GENERATOR REGULATOR

William J. Rady, Anderson, Ind., assignor to General Motors Corporation, Detroit, Mich., a corporation of Delaware Application April 10, 1942, Serial No. 438,477

10 Claims. (Cl. 320—65)

This invention relates to a storage battery charging system including an electric generator which is regulated by a vibratory regulator.

It is an object of the present invention to provide a system of generator voltage regulation through the use of vibratory regulators which are simple in construction and are reliable and durable in operation and which readily lend themselves to shielding to eliminate interference with radio apparatus.

This invention is particularly concerned with the regulation of generators used on military air and land vehicles. These generators have relatively large capacity and consequently the field current is relatively high. In carrying out the objects of my invention in connection with such generators, I provide a plurality of field circuits in order to divide the total field current. Each field circuit is provided with a vibratory regulator, the vibrators of which are controlled by a master vibrator. In this way the amount of current to be interrupted by the vibrator contacts is relatively small. The field circuit vibrators and the master vibrator are enclosed in sealed metal containers containing an inert gas to prevent oxidation of the vibrator contacts and also to provide radio shielding. Each of the vibrators is provided with plug terminal connections and sockets provided by an instrument panel, so that replacements can readily be effected.

Further objects and advantages of the present invention will be apparent from the following description, reference being had to the accompanying drawings wherein a preferred embodiment of the present invention is clearly shown.

In the drawings:

Fig. 5 is a front elevation of an instrument panel and junction box supporting the field vibrators and the master vibrator shown diagrammatically in the first four figures.

Fig. 6 is a side view looking in the direction of arrow 6 of Fig. 5.

Fig. 7 is a bottom view looking in the direction of the arrow 7 of Fig. 5.

Fig. 8 is a fragmentary back view of the junction box looking in the direction of arrow 8 of Fig. 6 with the back or mounting plate removed to show the sockets which receive the plugs from the master vibrator and one of the field vibrators.

Fig. 9 is a sectional view of the line 9—9 of Fig. 8.

Fig. 10 is a sectional view on line 10—10 of Fig. 9.

Fig. 11 is a view in the direction of the arrow 11 of Fig. 10, the vibrator case and base being shown in section.

Fig. 12 is a sectional view of the vibrator on line 12—12 of Fig. 10.

Fig. 13 is a fragmentary view on line 13—13 of Fig. 11.

Fig. 14 shows an assembly of the field regulating resistances; the base upon which the resistance assembly is mounted is shown in section; and an end position of the assembly is shown in section to show how the assembly is mounted upon a supporting screw.

Figure 1:
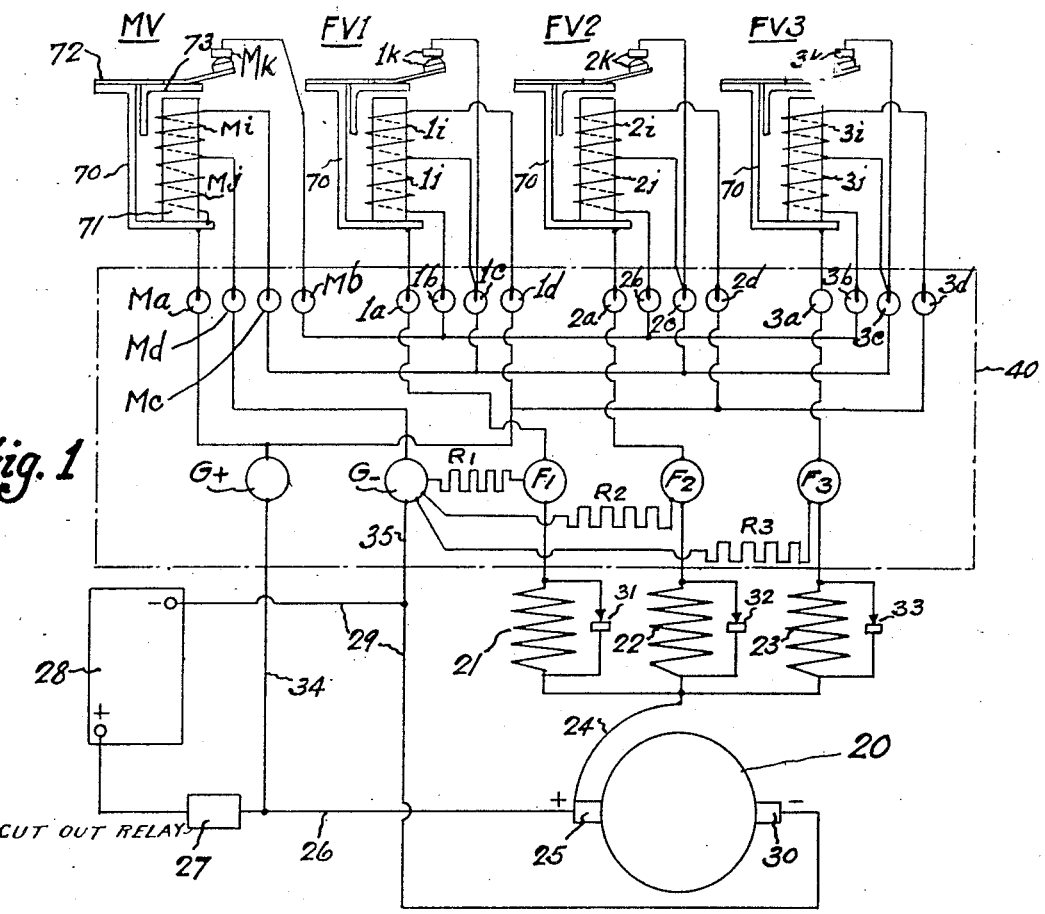
Fig. 1 is a wiring diagram of a generator regulating system embodying the present invention and shows particularly the arrangement of the vibrator terminals and the instrument panel terminals with which the generator and battery leads are connected.

Referring to Fig. 1, a generator 20 is provided with field circuits 21, 22 and 23 connected respectively with terminals F1, F2 and F3 of the regulator assembly and by wire 24 with generator positive brush 25 connected by wire 26 and cut-out relay 27 with the positive terminal of battery 28. The negative terminal battery 28 is connected by wire 29 with generator negative brush 30. Positive brush 25 is connected by wires 26 and 34 with terminal G+ of the regulator assembly. Generator brush 30 is connected by wires 29 and 35 with terminal G— of the regulator assembly.

The regulator assembly includes an instrument panel and junction box represented by the dot dash rectangle 40 in Fig. 1. The box 40 supports the terminals G+, G—, F1, F2, and F3 and field regulating resistances R1, R2 and R3 connected as shown between terminal G— and terminals F1, F2, and F3 respectively. The box 40 supports a master vibrator MV and three field regulating vibrators FV1, FV2 and FV3. All of these vibrators have plug terminals engaging sockets carried by the box 40. The sockets for vibrator MV are marked Ma, Mb, Mc and Md. The sockets for vibrator FV1 are marked 1a, 1b, 1c and 1d. The sockets for vibrator FV2 are marked 2a, 2b, 2c and 2d. The sockets for vibrator FV3 are marked 3a, 3b, 3c and 3d. Socket Ma and sockets 1d, 2d and 3d are connected as shown with terminal G+. Socket Md is connected with terminal G—. The sockets Mc, 1c, 2c and 3c are connected together. The sockets Mb, 1b, 2b and 3b are connected. The sockets 1a, 2a and 3a are connected respectviely with terminals F1, F2 and F3.

Each of the four vibrators has a magnetizable frame 70 supporting a magnetizable core 71 and connected by a spring-hinge 72 with a magnetizable armature 73 supporting a flexible metal blade 74 carrying a movable contact engageable with a stationary contact. The master vibrator has a pair of normally closed contacts Mk; and the field vibrators have pairs of normally closed contacts marked respectively 1k, 2k and 3k. The core of each of the vibrators is surrounded by two coils. In the case of the master vibrator MV these coils are assisting and they are marked respectively Mi and Mj. The coils of each of the field vibrators are bucking as indicated by arrows $x$ and $y$ in Fig. 2 and they are marked 1i and 1j, 2i and 2j, 3i and 3j, respectively. The connections between the coils and the contacts of the vibrators and the vibrator sockets are clearly shown on the diagram and require no further explanation.

Figure 2:
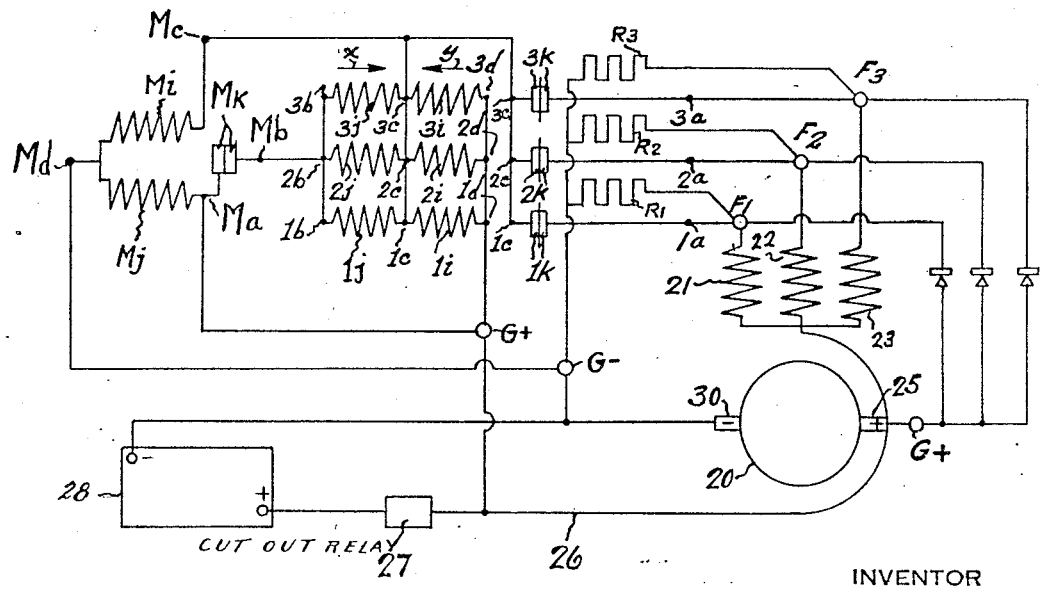
Fig. 2 is a simplified diagram of the circuit shown in Fig. 1.

The operation of the regulating system shown in Fig. 1 can be best explained with reference to the simplified diagram, Fig. 2. When the generator voltage is below that at which the master vibrator is set to operate, the master vibrator contacts MK remain closed, while the field vibrator contacts 1k, 2k and 3k remain closed to short-out resistances R1, R2 and R3 respectively which control the current in fields 21, 22 and 23 respectively. When the voltage of the generator attains that for which the master vibrator MV is adjusted to vibrate, the contacts Mk open, to open-circuit the vibrator coils 1j, 2j and 3j. Coils 1i, 2i and 3i are then unopposed and are effective to cause the opening of field vibrator contacts 1k, 2k, 3k, and thus reduce the field current to cause the generator voltage to decrease, whereupon the master vibrator contacts close again and the cycle is repeated so long as the generator voltage tends to exceed the voltage for which the master vibrator is set to vibrate. Electrical check valves 31, 32 and 33 of the copper oxide electrolytic type, shunting the fields 21, 22 and 23 respectively, prevent the self-induced voltage in these field windings from causing sparking at the contacts of the field vibrators.

Figure 3:
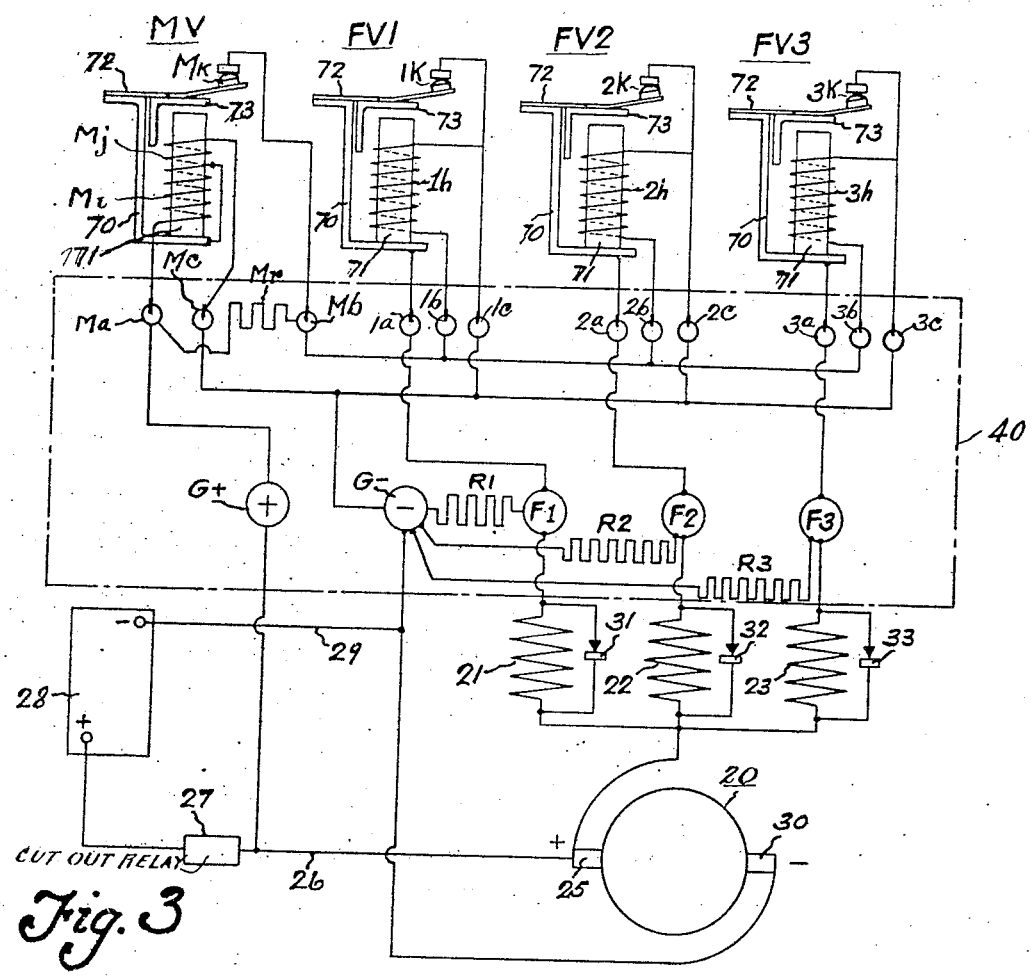
Fig. 3 is a wiring diagram of a modified form of the invention and shows the arrangement of the vibrator terminals and the instrument panel terminals.
Figure 4:
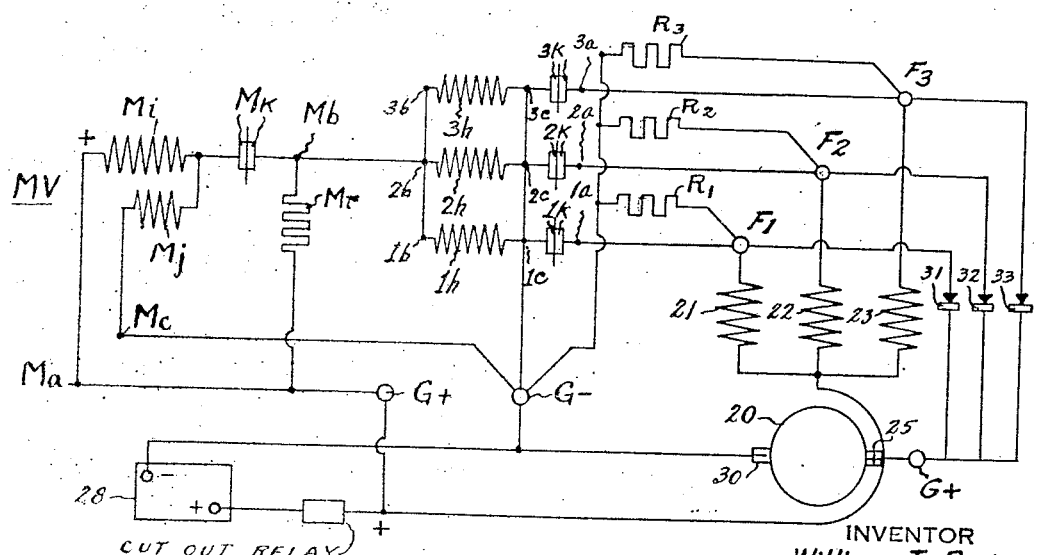
Fig. 4 is a simplified diagram of the circuit shown in Fig. 3.

In the system shown in Figs. 3 and 4, each field vibrator has a single coil marked 1h, 2h, 3h respectively. Master vibrator coil Mi (3500 turns of relatively fine wire) is connected with terminal Ma and with coil Mj (of 300 turns of relatively coarse wire and having very low resistance) and with contacts Mk. Normally closed contacts Mk are connected through the frame 70 with the junction of coils Mi and Mj and are connected with terminal Mb connected with the b terminals of the field vibrators. Coil Mj is connected with terminal Mc connected with the c terminals of the field vibrators and with terminal G—. The a terminals of the field vibrators are connected respectively with the terminals F1, F2, and F3 as in Figs. 1 and 2. Resistance Mr (100 ohms) is connected between terminals Ma and Mb.

While contacts Mk are closed, the generator terminal G+ and G— are connected by two circuits, coil Mj being in common to the two circuits. One of these circuits comprises resistance Mr, contacts Mk and coil Mj. Since coil Mj has very low resistance, resistance element Mr is relied on to provide sufficient resistance between the terminals G+ and G— to prevent short-circuiting of the generator while contacts Mk are closed. While contacts Mk are closed very little current passes through field vibrator coils 1h, 2h, 3h and the field vibrator contacts remain closed; and the resistances R1, R2, R3 remain short circuited. The other circuit across terminals G+ and G— comprises coils Mi and Mj which are in assisting relation. Coil Mj receives the current which passes across contacts Mk plus the current which passes through coil Mi.

When the generator voltage attains a value such that the combined excitation of coils Mi and Mj causes the armature 73 of vibrator Mv to be attracted toward its core 71, contacts Mk are separated thereby causing the field vibrator coils 1h, 2h, 3h to receive current sufficient to effect the opening of contacts 1k, 2k, 3k; and the resistances R1, R2, R3 are rendered effective to reduce the excitation of the generator. The pull on the armature 73 of vibrator MV is reduced, so that contacts Mk are closed; and then the contacts 1k, 2k, 3k of the field vibrators are closed; and the resistances R1, R2, R3 are short circuited, so that generator field excitation is caused to increase. This cycle is repeated so long as the voltage of generator tends to attain the value for which the master vibrator MV is set to vibrate. The action of vibrator MV is caused to be more rapid by the opening of contacts Mk which causes a reduction of current in coil Mj in addition to that reduction of current which takes place when the current in coil Mi is reduced.

Contacts Mk and coil Mj provide a low resistance bypass around the coils 1h, 2h, 3h when the contacts Mk are closed. Thus the current flow to the coils 1h, 2h, 3h is kept below operating value so long as the master vibrator contacts Mk remain closed. Resistance Mr prevents a dead short across the line when contacts Mk are closed.

Referring to Figs. 5, 6 and 7, the front face 41 of case 40 provides an instrument panel upon which vibrators MV, FV1, FV2 and FV3 are mounted in a manner to be described more fully later on. Upon the inner side of the wall 41 are mounted the various terminals G+, G—, F1, F2 and F3 and the sockets of the various vibrator terminals. Some of these vibrator terminal sockets are shown in Fig. 8, namely the sockets for the terminals for the master vibrator and the field vibrator FV3, when constructed and wired according to Figs. 1 and 2. Each socket is provided by a member 42 integral with a plate 42a and having resilient ears 42b. The plate 42a is located between an insulator 43 and a washer 44. A rivet having its head 45 received by a countersunk hole in insulator 43 extends through aligned holes in the plate 42a and the washer 44 and is riveted at 45a. The washer 44 is connected by soldering to a wire for connecting it with other parts of the regulator according to the wiring diagram.

The back of the box 40, or the right thereof, as viewed in Fig. 6, is left open until all of the connections have been made with the terminals G+, G—, F1, F2 and F3. The five wires connecting these terminals with the generator are brought out through an opening at 46, Fig. 6, within a collar 47 to which a cable may be attached. After the connections within the box have been completed, a back plate 48 is assembled and is attached by screws 48a. The back 48 has flanges 48b supporting soft rubber grommets 48c through which screws may be passed for securing the back 48 to a suitable support. The bottom wall of the box 40 supports a housing 49 secured by screws 49a. Housing 49 encloses a resistance assembly 50 which will now be described.

In Fig. 14 resistance assembly 50 comprises the resistances R1, R2 and R3 mounted on insulators 51, 52 and 53 provided at each end with metal eyelets 54 to which the ends of a resistance are respectively attached. A supporting screw 55 passes through a metal washer 56 and through an insulating tube 57. Insulating tube 57 passes through the following elements reading from bottom to top in Fig. 14: insulating washer 58, a first eyelet 54, a first terminal clip 59, a second insulating washer 58, a second eyelet 54, a second terminal clip 59, a third insulating washer 58, a third eyelet 54, a third terminal 59, a metal washer 60 and an insulating washer 61. The screw 55 passes also through a lock washer 62, a nut 63 threaded thereon, a hole in the bottom wall 41a of the box 40, a lock washer 64, a nut 65 threaded on the inner end of screw 55. The left end portions of the resistance assembly are secured together in the same manner and to the bottom wall 41a in the same manner.

The mechanical construction of the master vibrator and the field vibrators is the same. They may differ with respect to windings upon their cores 71. The construction of the vibrator FV3 will now be described.

With reference to Figs. 9 through 13, the lower end portion 71a (Fig. 12) of its core 71 serves as a rivet for attaching core 71 and the frame 70 to a non-conducting plate 75 of sheet insulating material. The core 71 supports the windings 3i and 3j (Figs. 1 and 2) and a bracket 76 having a screw thread apertured ear 77 for receiving a screw 78, Fig. 11, which attaches a contact bracket 79 carrying the upper contact 80 of the pair of vibrator contacts 3k. The lower contact 81 is mounted on the spring blade 74. The armature 73 and the flexible hinge plate 72 have been referred to in connection with Fig. 1. The parts 72, 73 and 74 are secured together by rivets 82. The hinge 72 is bifurcated and is secured by rivets 83 to the ears 84 of the frame 70. The rivets 82 serve also to attach a plate 85 having a tail 86 providing a hook 87 to which one end of a spring 88 is attached, the other end being attached to a hook 89a provided by bracket 89 attached to frame 70 by rivets integral therewith. Bending the hooks 87 and 89a adjusts the tension of spring 88.

The vibrator has four terminals 3a, 3b, 3c and 3d as has been described with reference to Fig. 1. These four terminals are provided by plugs which are marked P3a, P3b, P3c and P3d in Figs. 8, 9, 10, 11 and 12. Each plug terminal provides a rivet portion for securing together the following superposed elements reading from bottom to top in Fig. 12: an insulating disc 90, a metal disc 91, a soft rubber disc 92 and the insulating disc 75. The soft rubber disc was vulcanized to the metal disc 91 and to the shanks of rivets provided by the various plugs P3a, etc. The connections between the contacts and coils of the vibrator and the plug terminals are made according to the diagram shown in Fig. 1, namely the frame 70 is connected with terminal plug P3a, the outer end of the coil 3j is connected with terminal plug P3b. The inner ends of the coils 3j and 3i and the extension 79a (Fig. 11) of bracket 79 are connected with terminal plug P3c. The outer end of coil 3i is connected with terminal plug P3d. The vibrator is enclosed by a cup-shaped shell 100 providing an annular shoulder at 101 for receiving the assembly of discs 91, 92 and 75. The annular edge of the housing 100 is formed at 102 so as to clamp the discs 91, 92 and 75 against the annular shoulder 101 thereby compressing the periphery portion of the soft rubber disc 92 to cause the same to be squeezed against the adjacent cylindrical wall of the housing 100, thereby providing an effective seal. Flange 102 is soldered at 102a to the metal disc 91. The upper end wall of the housing is provided with a flanged aperture 105 provided by a flange 106 providing means for attaching a coupling connected with a tube, not shown, for making connection with a vacuum pump, or with a source of inert gas under pressure. The procedure is to evacuate the housing 100 and admit an inert gas such as nitrogen and then evacuate again and fill with nitrogen at a desired pressure.

The vibrator per se is described and claimed in my copending application Serial No. 426,154 filed January 9, 1942.

The front wall 41 of the box 40 is provided with holes 110 which will register with the vibrator connector plugs P3a, etc., and are of larger diameter than the walls 111 of these plugs. The plugs extend through holes in insulator 43a which is located between wall 41 and the insulator 43 and serves to insulate the rivet heads 45 from wall 41 as shown in Fig. 9.

If the system according to Figs. 3 and 4 is used the box 40 will carry the plug sockets, terminals and interconnectors shown diagrammatically in Fig. 3 in place of those shown in Fig. 1.

Figure 15:
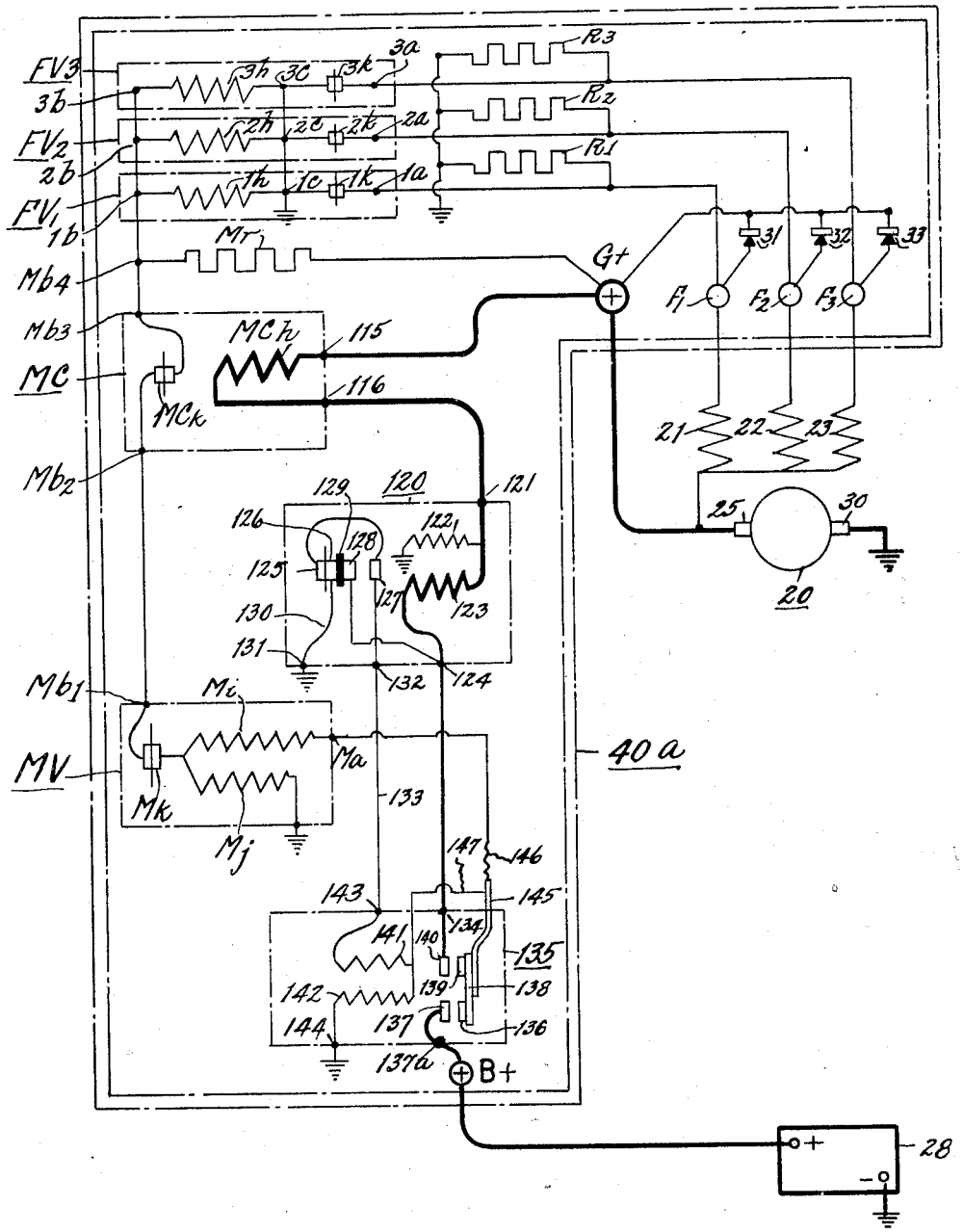
Fig. 15 is a wiring diagram of another form of the invention in which a master current regulator, as well as a master voltage regulator controls the field vibratory regulators.

Fig. 15 shows diagrammatically the combination of the system shown in Figs. 3 and 4 with a master current vibrator MC. The connector between terminal Mb and contacts Mk of Figs. 3 and 4 is replaced by a series of connections between terminals Mb1, Mb2, Mb3, Mb4 in Fig. 15. The contacts MCk of master-current vibrator MC are connected between Mb2 and Mb3. The magnet coil MCh of the master-current vibrator MC is connected with terminals 115 and 116 connected, respectively, with terminal G+ and terminal 121 of reverse-current relay 120 having a series or current coil 123 connected between terminals 121 and 124 and voltage coil 122 connected between terminal 121 and ground. The armature (not shown) of relay 120 carries contacts 126 and 128 separated by insulation 129. Contact 126, which is connected by flexible lead 130 with grounded terminal 131, normally engages contact 125 connected with contact 127 adapted to be engaged by armature supported contact 128 but normally not engaged by it. Contact 128 is connected with terminal 124. Contact 127 is connected with terminal 132 connected by wire 133 with terminal 143 of cut-out relay 135.

The cut-out relay 135, which is controlled by the reverse current relay 120, has a terminal 134 connected with terminal 124 of relay 120. Relay 135 has an armature (not shown) carrying a strap 138 supporting contacts 136 and 139 normally separated from contacts 137 and 140 and adapted, respectively, to engage them. Contact 140 is connected with terminal 134. Contact 137 is connected with terminal 137a connected with terminal B+ connected with battery 28. Strap 138 carries a terminal clip 145 connected by wire 146 with terminal Ma of master voltage regulator MV. Clip 145 is connected by a wire 147 with the junction magnet coils 141 and 142 of relay 135. The magnet coil 141 of relatively few turns (800 turns) and low resistance is connected with terminal 143. The magnet coil 142 of relatively high resistance (6800 turns of #34 wire) is connected with a terminal 144 which is grounded.

The electrical dimensions of the coils of the master vibrator MV and of the field vibrators FV1, FV2, FV3 and of the resistance Mr would be the same as for Figs. 3 and 4 other conditions being the same. The normal by-pass around the field vibrator coils 1h, 2h, 3h is provided by the circuit comprising, in series, master current vibrator contacts MCk, master voltage vibrator contacts Mk and coil Mj. This by-pass is open-circuited whenever either or both of these sets of contacts open as the result of either the attainment of a predetermined generator voltage the attainment of a predetermined current output or the attainment of both. Then the field vibrators become effective to reduce full excitation as has been explained with reference to Figs. 3 and 4.

The master vibrators MV and MC do not function until after relay 120 causes relay 135 to complete the battery charging circuit indicated in heavy lines in Fig. 15. At a certain generator voltage in excess of battery counter voltage, coil 122 of relay 120 is excited sufficiently to cause the armature (not shown) to move to cause contact 128 to engage contact 127 and contact 126 to separate from contact 125. Then terminal 124 is connected by contacts 127 and 128, terminal 132, wire 133, terminal 143 with coils 141 and 142 which are ground-connected with the generator 20. Under these conditions coil 141 assists coil 142 in closing the contacts of relay 135. The battery charging circuit is completed by the engagement of contacts 137 and 140 with contacts 136 and 139 respectively, connected by strap 138. Coil MCh of master current regulator MC becomes operative and coils Mi and Mj of master voltage vibrator MV are connected directly across the line. Coil 142 is also connected directly across the line by the closing of the contacts of relay 135. Coil 142 is therefore energized by a circuit independent of the relay 120, so that any fluttering of the armature of relay 120 does not effect relay 135. The master vibrators MV and MC are operative individually and jointly to control the field vibrators FV1, FV2, FV3 in the manner accomplished by the vibrator MV alone in Figs. 3 and 4.

When the speed of the generator 20 falls to such low value that the battery 28 tends to discharge through the generator 20, the current in coil 123 of relay 120 reverses thereby neutralizing the effect of the coil 122 and the armature of relay 120 is returned by a spring (not shown) to normal position in which contact 126 re-engages contact 125 and contact 128 separates from contact 127. When this occurs, the coil 141 of relay 135 is connected in bucking relation to the coil 142 of relay 135; coil 142 is neutralized and relay 135 opens. Any fluttering of the armature of relay 120 between the operating position of engaging contacts 127 and 128 and of separating contact 126 from contact 125 and the normal position shown in Fig. 15 does not affect relay 135. The operating position of the armature of relay 120 must be fully established before relay 135 closes, and the armature of relay 120 must fully return to normal position before relay 135 opens.

The space enclosed by parallel dot-dash lines represents an instrument panel or junction box 40a upon which each of the instruments FV1, FV2, FV3, MC, MV, 120, 135 may be separately mounted by any suitable means including plug and socket terminals such as illustrated in Fig. 8. For the terminals in the battery, charging circuit (heavy lines) screw fastenings are recommended.

The box 40a carries the field terminals F1, F2, F3, a generator terminal G+ and a battery terminal B+. If the system shown in Fig. 15 were a non-grounded system, a metallic part of the box 40a would serve as a common ground for the grounds indicated in Fig. 15, and this metallic part would carry a G— terminal to which the generator and battery are connected as in Fig. 3.

While the embodiments of the present invention as herein disclosed, constitute preferred forms, it is to be understood that other forms might be adopted all coming within the scope of the claims which follow.

What is claimed is as follows:

1. A battery charging system comprising in combination; a storage battery; a battery charging generator having a plurality of field circuits; an electrical valve connected across each field circuit; a resistance unit in each field circuit; circuits each including a normally closed switch shunting a field resistance; electromagnets having cores and coils for opening the resistance-shunting switches; a circuit normally operative to prevent the creation in the cores of said electromagnets of a magnetism sufficient to effect the opening of the resistance shunting switches said circuit including normally closed contacts; and electro-magnetic means responsive to a predetermined generator voltage for opening said last mentioned normally closed contacts.

2. A battery charging system comprising in combination; a storage battery; a battery charging generator having a plurality of field circuits; an electrical valve connected across each field circuit; a resistance unit in each field circuit; circuits each including a normally closed switch shunting a field resistance; electromagnets having cores and coils for opening the resistance-shunting switches; a circuit including coils bucking said electromagnet coils and normally operative to neutralize the effect of said electromagnet coils so as to prevent the creation in the cores of said electromagnets of a magnetism sufficient to effect the opening of the resistance shunting switches said circuit including normally closed contacts; and electromagnetic means responsive to a predetermined generator voltage for opening said last mentioned normally closed contacts.

3. A battery charging system comprising in combination; a storage battery; a battery charging generator having a plurality of field circuits; an electrical valve connected across each field circuit; a resistance unit in each field circuit; circuits each including a normally closed switch shunting a field resistance; electromagnets having cores and coils for opening the resistance-shunting switches; a circuit normally operative to provide a low resistance by-pass around the coils of said electromagnets to prevent the creation in the cores of said electromagnets of a magnetism sufficiently to effect the opening of the resistance shunting switches said circuit including normally closed contacts; and electromagnetic means responsive to a predetermined generator voltage for opening said last mentioned normally closed contacts.

4. A battery charging system comprising in combination; a storage battery; a battery charging generator having a plurality of field circuits; an electrical valve connected across each field circuit; a resistance unit in each field circuit; circuits each including a normally closed switch shunting a field resistance; electromagnets having cores and coils for opening the resistance-shunting switches; a circuit normally operative to prevent the creation in the cores of said electromagnet of a magnetism sufficient to effect the opening of the resistance shunting switches said circuit including two pairs of normally closed contacts in series; electromagnetic means responsive to a predetermined generator voltage for opening one of said pairs of contacts; and means responsive to a predetermined generator current for opening the other of said pairs of contacts.

5. A battery charging system comprising in combination; a storage battery; a battery charging generator having a plurality of field circuits; an electrical valve connected across each field circuit; a resistance unit in each field circuit; circuits each including a normally closed switch shunting a field resistance; electromagnets having cores and coils for opening the resistance-shunting switches; a circuit normally operative to provide a low resistance by-pass around the coils of said electromagnets to prevent the creation in the cores of said electromagnets of a magnetism sufficient to effect the opening of the resistance shunting switches said circuit including two pairs of normally closed contacts in series; electromagnetic means responsive to a predetermined generator voltage for opening one of said pairs of contacts; and means responsive to a predetermined generator current for opening the other of said pairs of contacts.

6. A battery charging system comprising, in combination, a storage battery; a battery charging generator; a first line for connecting one terminal of the generator with a battery terminal of like polarity and including current responsive magnet coil and a normally open switch; a second line of opposite polarity for connecting the other terminal of the generator with the other terminal of the battery, said second line being, for example, a ground line; a cut-out-relay including the normally open switch of the first line and electromagnetic means for controlling said switch and comprising two magnet coils respectively of low and high resistance connected to a common junction, the other end of the high resistance coil being directly connected to the second line, said cut-out-relay having means responsive to the closing of the normally open switch for connecting the junction of the two magnet coils with the first line; and a reverse current relay comprising the magnet coil in the first line and a voltage responsive magnet coil across the lines, and a switch means operating in its normal position to connect the low resistance coil of the cut-out-relay with the second line, and actuated by energization of the voltage responsive coil to interrupt the connection between the low resistance coil of the cut-out-relay and the second line and to connect the two coils of the cut-out-relay in series across the lines in assisting relation, said coils being in bucking relation only when the switch of the reverse-current-relay returns to normal relation while the switch of the cut-out-relay is closed, whereby said last mentioned switch opens.

7. A battery charging system comprising, in combination, a storage battery; a battery charging generator; having a field circuit; a resistance unit in the field circuit; a normally closed switch shunting the resistance; a first line for connecting one terminal of the generator with a battery terminal of like polarity and including current responsive magnet coil and a normally open switch; a second line of opposite polarity for connecting the other terminal of the generator with the other terminal of the battery, said second line being, for example, a ground line; means for controlling the operation of the field-resistance shunting-switch and including electro-magnet windings, a cut-out-relay including the normally open switch of the first line and electromagnetic means for controlling said switch and comprising two magnet coils respectively of low and high resistance connected to a common junction, the other end of the high resistance coil being directly connected to the second line, said cut-out-relay having means responsive to the closing of the normally open switch for connecting the junction of the two magnet coils with the first line; and responsive to the closing of the normally open switch for connecting across the lines the electromagnet-windings which control the operation of the field-resistance shunting switch; and a reverse current relay comprising the magnet coil in the first line and a voltage responsive magnet coil across the lines, and a switch means operating in its normal position to connect the low resistance coil of the cut-out relay with the second line, and actuated by energization of the voltage responsive coil to interrupt the connection between the low resistance coil of the cut-out-relay and the second line, and to connect the two coils of the cut-out-relay in series across the lines in assisting relation, said coils being in bucking relation only when the switch of the reverse-current-relay returns to normal relation while the switch of the cut-out-relay is closed, whereby said last mentioned switch opens.

8. A battery charging system comprising, in combination, a storage battery; a battery charging generator; having a plurality of field circuits; a resistance unit in each field circuit; electromagnetically operated field relays each having a normally closed switch shunting a field resistance; a first line for connecting one terminal of the generator with a battery terminal of like polarity and including current responsive magnet coil and a normally open switch; a second line of opposite polarity for connecting the other terminal of the generator with the other terminal of the battery, said second line being, for example, a ground line; a master vibrator for controlling the operation of the field relay electromagnets and having electromagnet windings; a cut-out-relay including the normally open switch of the first line and electromagnetic means for controlling said switch and comprising two magnet coils respectively of low and high resistance connected to a common junction, the other end of the high resistance coil being directly connected to the second line, said cut-out-relay having means responsive to the closing of the normally open switch for connecting the junction of the two magnet coils with the first line; and responsive to the closing of the normally open switch for connecting across the lines the electromagnet windings of the master vibrator; and a reverse current relay comprising the magnet coil in the first line and a voltage responsive magnet coil across the lines, and a switch means operating in its normal position to connect the low resistance coil of the cut-out-relay with the second line, and actuated by energization of the voltage responsive coil to interrupt the connection between the low resistance coil of the cut-out-relay and the second line and to connect the two coils of the cut-out-relay in series across the lines in assisting relation, said coils being in bucking relation only when the switch of the reverse-current relay returns to normal relation while the switch of the cut-out-relay is closed, whereby said last mentioned switch opens.

9. A battery charging system comprising, in combination, a storage battery; a battery charging generator; having a plurality of field circuits; a resistance unit in each field circuit; electromagnetically operated field relays each having a normally closed switch shunting a field resistance; a first line for connecting one terminal of the generator with a battery terminal of like polarity and including current responsive magnet coil and a normally open switch; a second line of opposite polarity for connecting the other terminal of the generator with the other terminal of the battery, said second line being, for example, a ground line; a master vibrator for controlling the operation of the field relay electromagnets and having a pair of normally closed contacts for shunting the field-relay electromagnets and having electromagnet windings for controlling the last mentioned contacts; a resistor connected across the lines through said last mentioned contacts to protect the generator; a cut-out-relay including the normally open switch of the first line and electromagnetic means for controlling said switch and comprising two magnet coils respectively of low and high resistance connected to a common junction, the other end of the high resistance coil being directly connected to the second line, said cut-out-relay having means responsive to the closing of the normally open switch for connecting the junction of the two magnet coils with the first line; and responsive to the closing of the normally open switch for connecting across the lines the electromagnet windings of the master vibrator; and a reverse current relay comprising the magnet coil in the first line and a voltage responsive magnet coil across the lines, and a switch means operating in its normal position to connect the low resistance coil of the cut-out-relay with the second line, and actuated by energization of the voltage responsive coil to interrupt the connection between the low resistance coil of the cut-out-relay and the second line and to connect the two coils of the cut-out-relay in series across the lines in assisting relation, said coils being in bucking relation only when the switch of the reverse-current relay returns to normal relation while the switch of the cut-out-relay is closed, whereby said last mentioned switch opens.

10. A battery charging system comprising, in combination a storage battery; a battery charging generator; having a plurality of field circuits, a resistance unit in each field circuit; electromagnetically operated field relays each having a normally closed switch shunting a field resistance; a first line for connecting one terminal of the generator with a battery terminal of like polarity and including current responsive magnet coil and a normally open switch; a second line of opposite polarity for connecting the other terminal of the generator with the other terminal of the battery, said second line being, for example, a ground line; a circuit for by-passing the magnet coils of the field relays and comprising two normally closed switches in series; a resistor connected across the line through said series-connected normally closed switches; a current responsive electromagnet for opening one of the switches and connected in series in one of the lines, a voltage responsive electromagnet for opening the other of said by-passing switches; a cut-out-relay including the normally open switch of the first line and electromagnetic means for controlling said switch and comprising two magnet coils respectively of low and high resistance connected to a common junction, the other end of the high resistance coil being directly connected to the second line, said cut-out-relay having means responsive to the closing of the normally open switch for connecting the junction of the two magnet coils with the first line; and responsive to the closing of the normally open switch for connecting across the lines the voltage responsive electromagnet which controls the opening of one of said by-passing switches; and a reverse current relay comprising the magnet coil in the first line and a voltage responsive magnet coil across the lines, and a switch means operating in its normal position to connect the low resistance coil of the cut-out-relay with the second line, and actuated by energization of the voltage responsive coil to interrupt the connection between the low resistance coil of the cut-out-relay and the second line and to connect the two coils of the cut-out-relay in series across the lines in assisting relation, said coils being in bucking relation only when the switch of the reverse current relay returns to normal relation while the switch of the cut-out-relay is closed, whereby said last mentioned switch opens.

WILLIAM J. RADY.